(12) United States Patent
Gascuel

(10) Patent No.: US 11,144,628 B2
(45) Date of Patent: Oct. 12, 2021

(54) ACCESS CONTROL SYSTEM

(71) Applicant: Jacques Claude Guy Gascuel, Andorre (FR)

(72) Inventor: Jacques Claude Guy Gascuel, Andorre (FR)

(*) Notice: Subject to any disclaimer, the term of this patent is extended or adjusted under 35 U.S.C. 154(b) by 100 days.

(21) Appl. No.: 16/072,139

(22) PCT Filed: Jan. 24, 2017

(86) PCT No.: PCT/FR2017/050139
§ 371 (c)(1),
(2) Date: Jul. 23, 2018

(87) PCT Pub. No.: WO2017/129887
PCT Pub. Date: Aug. 3, 2017

(65) Prior Publication Data
US 2018/0336335 A1    Nov. 22, 2018

(30) Foreign Application Priority Data
Jan. 25, 2016   (FR) ...................................... 1650570

(51) Int. Cl.
*G06F 21/35*   (2013.01)
*G06F 21/79*   (2013.01)
*G06F 21/81*   (2013.01)
*G06F 21/88*   (2013.01)

(52) U.S. Cl.
CPC .............. *G06F 21/35* (2013.01); *G06F 21/79* (2013.01); *G06F 21/81* (2013.01); *G06F 21/88* (2013.01); *G06F 2221/2111* (2013.01)

(58) Field of Classification Search
CPC .......... G06F 21/35; G06F 21/88; G06F 21/81; G06F 21/79; G06F 2221/2111
See application file for complete search history.

(56) References Cited

U.S. PATENT DOCUMENTS

| 8,823,494 B1* | 9/2014 | Kovitz ................ H04W 12/003 340/10.1 |
| 9,177,453 B2 | 11/2015 | Gill et al. |
| 2008/0098134 A1 | 4/2008 | Van Acht et al. |
| 2014/0283018 A1 | 9/2014 | Dadu et al. |
| 2017/0018130 A1* | 1/2017 | Robinson ................. G07C 9/38 |

OTHER PUBLICATIONS

International Search Report dated May 4, 2017, issued in corresponding International Application PCT/FR2017/050139, Jan. 24, 2017, 9 pages.

* cited by examiner

*Primary Examiner* — Mohammed Waliullah
(74) *Attorney, Agent, or Firm* — Christensen O'Connor Johnson Kindness PLLC

(57) ABSTRACT

The invention relates to a system for controlling access to a device protected by at least one pre-configured authentication factor, comprising an access control unit comprising a short-range wireless communication device, a module for receiving keys, a module for verifying authentication factors, at least one access path, and at least one controllable switch, configured to open or close the path for accessing the protected device in case of receiving an access authorisation coming from the verification module. The system further comprises an administration unit, adapted to allow to pre-configure each authentication factor and a user unit, configured to transmit at least one key to the module for receiving keys.

11 Claims, 1 Drawing Sheet

ACCESS CONTROL SYSTEM

1. Technical Field of the Invention

Figure 1:
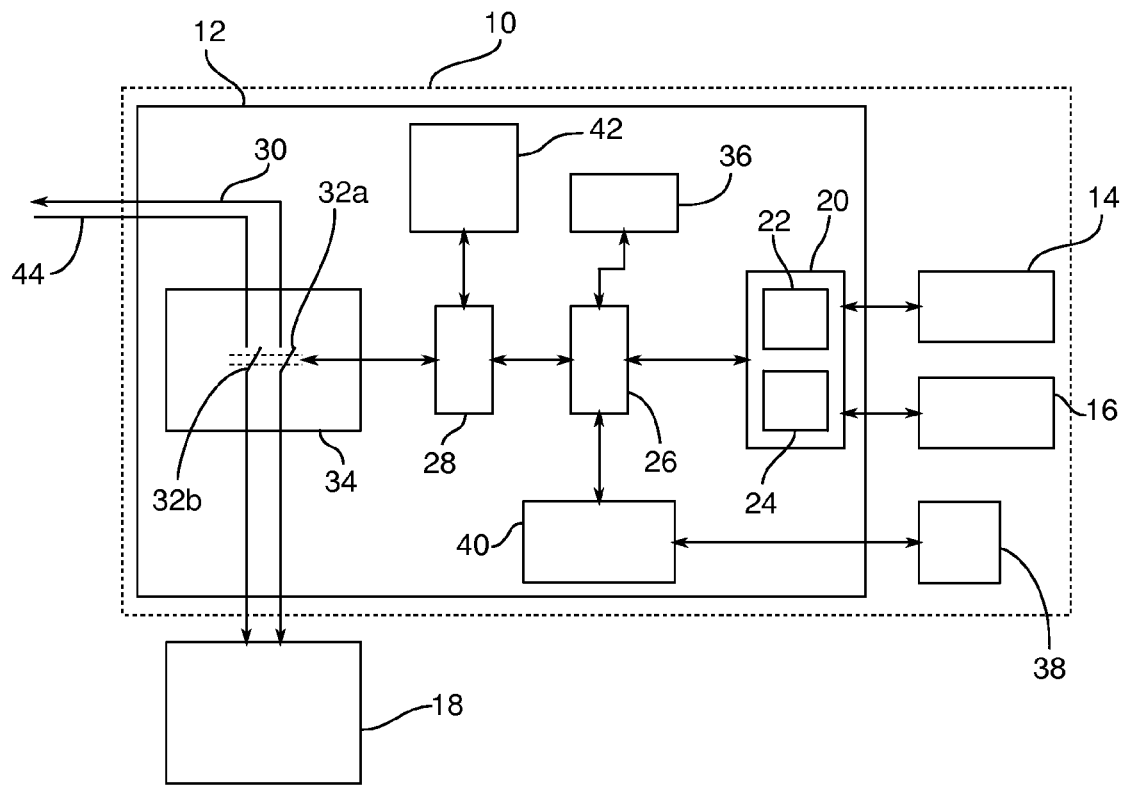

The invention relates to an access control system. In particular, the invention relates to a control device for accessing a protected device, for example, access to one or more protected memories of an electronic component.

2. Technological Background

Access control systems allow limiting access to a protected device, only to persons who have the necessary authorisation to access the protected device. This protected device may be, for example, a memory containing digital data to which access should be limited, or a locked piece of physical equipment of which the use is subject to an access authorisation.

Current access control systems generally implement one or more authentication factors before issuing an access authorisation. Each authentication factor defines one or more validity criteria for a key that is presented to it, a valid key allowing placing the authentication factor in a state referred to as unlocked. When all the authentication factors are unlocked, access is authorised. It may, for example, be a password, which is compared with a list of authorised passwords.

Verifying that the authentication factors match at least one key and configuring the authentication factors are often done by means of a connection to an external server, in particular via the Internet. This solution features interception risks of data being stolen by a rogue operator, allowing obtaining information, either on the authentication factor implemented, or on the key subject to the authentication factor.

Furthermore, current access control systems are not very flexible, and authentication factors are easily identifiable by any rogue person wanting to access the protected device without authorisation. Attacks intended to obtain access are therefore focused on these factors.

3. AIMS OF THE INVENTION

The invention aims to overcome at least some of the disadvantages of known access control systems.

In particular, the invention aims to provide, in at least one embodiment of the invention, an autonomous access control system, not requiring any connection with an external server.

The invention also aims to provide, in at least one embodiment, an access control system allowing a customisable configuration of the authentication factors.

4. SUMMARY OF THE INVENTION

For this purpose, the invention relates to an access control system to a device protected by at least one pre-configured authentication factor, each authentication factor defining at least one validity criterion of a key and being in a state referred to as unlocked if a key that is presented to it meets the validity criteria and a state referred to as locked if no key that is presented to it meets the validity criteria, comprising:
an access control unit comprising:
a short-range wireless communication device, comprising a wireless data transmission module and an electrical energy collection module,
a module for receiving keys, adapted to receive at least one key,
a module for verifying factors, adapted to verify the validity of each pre-configured authentication factor with at least one key received by the module for receiving keys and to provide an access authorisation if all the authentication factors are in the unlocked state,
at least one access path, adapted to allow access to the protected device,
at least one controllable switch, configured to open or close the access path to the protected device, the access path being, by default, closed and being open in case of receiving an access authorisation coming from the module for verifying factors,
an administration unit, adapted to allow to pre-configure each authentication factor by interaction with the wireless data transmission module of the connection device of the access control unit,
a user unit, configured to transmit at least one key to the module for receiving keys, via the wireless data transmission module.

An access control system according to the invention therefore allows to manage access to a protected device autonomously, without connection to an external server, the configuration of the use factors and the verification of the use factors are only done in the access control unit or in the proximity thereof, the interactions with the access control unit being done only via a short-range wireless connection (less than 100 m). The access system is therefore more resistant to attacks by interception of frames, as critical interactions (in particular, pre-configuration of authentication factors by the administrator using the administration unit and an access attempt by a user using a user unit) are only done locally at short range.

In addition, authentication factors are totally configurable beforehand by a human administrator, via the administration unit.

The administration unit and the user unit are equipment allowing the wireless transmission of data, each of which being controlled by a human operator, respectively called administrator and user. The administration unit and the user unit are therefore separate, in other words, they are separate equipment used by separate human operators. The equipment is, for example, a communication terminal such as a smartphone. The administrator defines authentication factors using the administration unit and the user attempts to unlock access to the protected device with the user unit. Keys may be provided manually by the administrator to the user, for example, by validation on an application or a piece of software installed on the administration unit and transmission to the user unit.

The system is further autonomous thanks to the energy collection carried out by the electrical energy collection module. This energy collection is, for example, a photovoltaic, kinetic, thermoelectric, etc. energy collection and is chosen according to the device to be protected, the function thereof, etc. The energy collection allows the system to no longer depend on just a battery, which has a limited lifespan. The system may however comprise an energy storage device, recharged using the energy collection (allowing, for example, to store photovoltaic energy during the day for using the system at the night).

The protected device, of which access and/or use are controlled by the system, may be different types, for example, a storage means that may be read by a computer (USB flash drive type memory, external or internal hard drive, etc.), a vehicle (protected self-service car, bike or scooter, etc.), an access door, etc.

The access path allowing access to the protected device is, for example a data transmission bus. The controllable switch allows to physically controlling this transmission bus. The access path is open (in other words, the protected device may be accessed) when the switch is electrically closed and vice versa, the access path is closed when the switch is electrically open.

Thus, for example, when the protected device is a storage support, if the storage medium is connected to a computer, and if the access path is closed, the presence of the storage medium is not detected by the computer, and is therefore not detectable by an unauthorised rogue operator.

Advantageously and according to the invention, each authentication factor defines at least one validity criterion of a key chosen from the group comprising the following keys:
  password,
  key transmitted by the administration unit,
  data for geolocating the protected device and/or the user unit,
  values measured by one or more electronic sensors,
  time data,
  key coming from a proximity tag.

According to this aspect of the invention, authentication factors may be of different types and may be combined in order to offer the best security possible, according to the context in which the protected device is used.

A device protected by the control system is thus accessible only if all the authentication factors are unlocked: for example, the access of a user to a hard drive containing professional information may be authorised, only if the hard drive is located in the professional premises (geolocation factor or proximity tag), during authorised working hours (time factor), if the user has their telephone with them and if the user has entered their password.

Advantageously and according to the invention, the short-range wireless communication device is a wireless near-field communication device, and the administration unit and the user unit are adapted to provide an electrical energy to the electrical energy collection module of the wireless near-field communication device to supply the access control unit.

According to this aspect of the invention, the wireless communications between the administration unit and the wireless communication device or between the user unit and the wireless communication device are near-field communications, of NFC type. Near-field communications allow to increase the security of the access control system, the pre-configuration by the administration unit and a connection attempt by the user before being done in direct proximity, less than 20 cm. Furthermore, the administration unit and the user unit give the necessary electrical energy to supply the access control unit when they are used. Thus, the control unit cannot be supplied when it is not used, making it particularly invisible in terms of electromagnetic radiation. The control unit may thus be concealed and therefore less easily detectable to users not informed of the location thereof.

Advantageously and according to the invention, the access control unit comprises at least one controllable switch configured to open or close an electrical supply of the protected device, independent from the control unit, the supply, by default, being closed and being open in case of receiving an access authorisation coming from the module for verifying factors.

According to this aspect of the invention, the electrical energy supply of the protected device is also controlled by the access control system. If access is not authorised, the supply is closed and the protected device is thus less visible and unauthorised access to the content of the device is more difficult.

Advantageously, a system according to the invention comprises a proximity tag, external to the control unit, comprising a random key generator adapted to periodically generate a proximity key and transmit the proximity key to the control unit by a wireless communication protocol, said proximity tag and said control unit being paired beforehand by the administration unit.

According to this aspect of the invention, the proximity tag allows to know if the protected device is located in a specific zone (in the range of the proximity tag) or outside this zone (beyond the range of the proximity tag). The location of the protected device by the proximity tag allows to not being dependent on the geolocation information provided by a user, which may be falsified. The proximity tag may further be concealed, access to the protected device thus being dependent on the proximity tag, but without the user being aware of the necessity of this proximity tag.

The proximity key transmitted to the access control unit forms part of the keys of which the validity criteria are verified. The presence (or absence) of this proximity key may thus be an authentication factor verified by the module for verifying factors of the access control unit.

The invention also relates to a data storage medium, comprising at least two separate protected memories, characterised in that access to each protected memory is controlled by an access control system according to the invention.

A storage medium according to the invention allows to accommodate independent memories in one same piece of equipment and to apply different authentication factors to them, thus allowing having memories which could contain information that is not configured to be used simultaneously, or that may only be used under certain conditions.

The invention also relates to a method for controlling access to a protected device by an access control system according to the invention, characterised in that it comprises:
  a step of pre-configuring authentication factors by an administrator using the administration unit,
  a step of transmitting at least one key by a user using the user unit,
  a step of opening the access path to the protected device if all the authentication factors are unlocked.

Advantageously, a method according to the invention comprises:
  a step of sending a request by the user via the user unit, to the administration unit,
  a step whereby the administrator manually validates the request via the administration unit,
  a step of transmitting a validation key by the administration unit to the user unit, if the request is validated by the administrator.

According to this aspect of the invention, the administrator manually validates the request of the user, without automatic processing, allowing to increase the security of the system by only authorising users approved by the administrator to access the protected device.

The invention also relates to an access control system, a storage medium and an access control method, characterised in combination by all or part of the characteristics mentioned above or below.

5. LIST OF FIGURES

Figure 2:
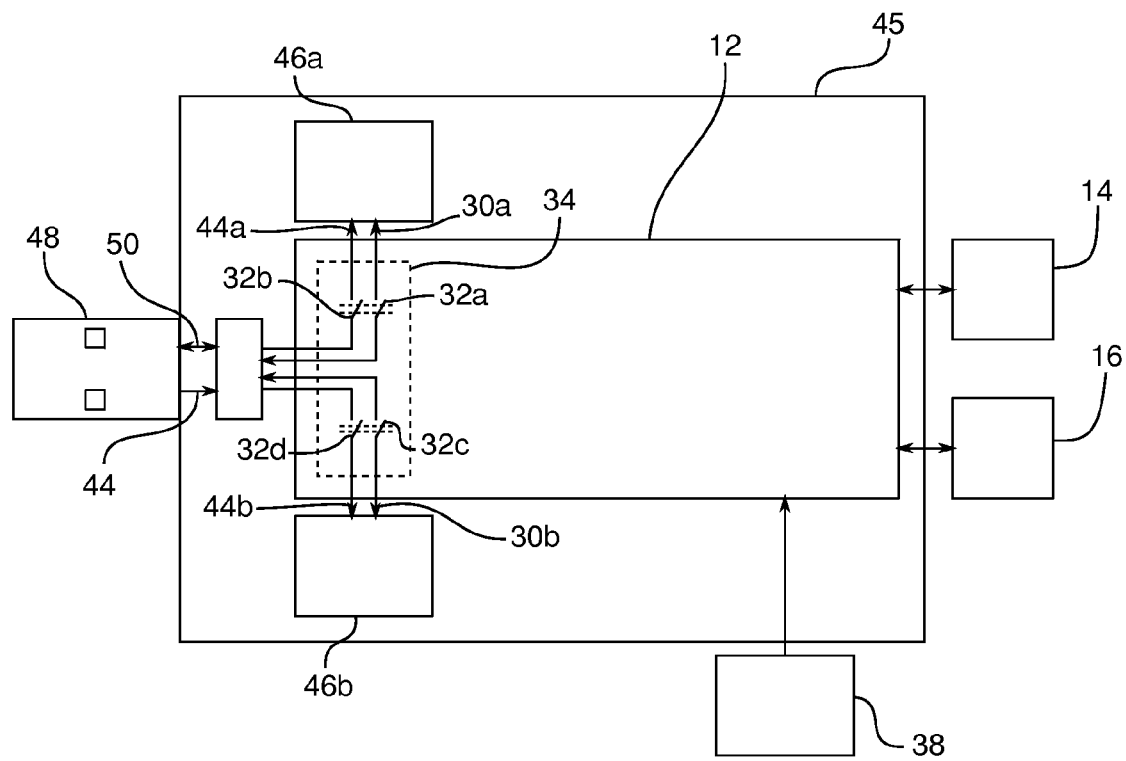

Other aims, characteristics and advantages of the invention will appear upon reading the following description given only in a non-limitative manner, and which refers to the appended figures, wherein:

FIG. 1 is a schematic view of an access control system to a protected device according to an embodiment of the invention, FIG. 2 is a schematic view of a storage medium protected by an access control system according to an embodiment of the invention.

6. DETAILED DESCRIPTION OF AN EMBODIMENT OF THE INVENTION

The following embodiments are examples. Although the description refers to one or more embodiments, this does not necessarily mean that each reference relates to the same embodiment, or that the characteristics apply only to one single embodiment. Single characteristics of different embodiments may also be combined to provide other embodiments. In the figures, scales and proportions are not strictly respected for the purpose of illustration and clarity.

FIG. 1 schematically represents an access control system 10 according to an embodiment of the invention.

The control system 10 comprises an access control unit 12, an administration unit 14 and a user unit 16.

The aim of the access control system is to control access to a protected device 18, for example, a storage medium, a memory of a storage medium, a self-service vehicle by means of prior authorisation, an access door, etc.

The device 18 is protected by at least one pre-configured authentication factor. The system 10 allows to control the validity of keys which are presented to it according to each authentication factor: an authentication factor is in an unlocked state if a key that is presented to it matches the validity criteria, and in a state referred to as locked if no key that is presented to it matches the validity criteria. For example, an authentication factor may simply be a password matching a defined password. If the password presented is identical to the defined password, the authentication factor is in the unlocked state.

The device 18 is generally protected by a plurality of pre-configured authentication factors, and access to the protected device 18 is only permitted if all the authentication factors are unlocked.

For this purpose, the access control unit 12 comprises:
- a short-range wireless communication device 20, comprising a wireless data transmission module 22 and an electrical energy collection module 24,
- a module 26 for receiving keys,
- a module 28 for verifying factors,
- at least one access path 30 to the protected device,
- at least one controllable switch, here a first controllable switch 32a and a second controllable switch 32b, combined in one switch module 34.

In the whole text, "module" means a software element, a sub-assembly of a software program, which could be compiled separately, either for independent use, or to be assembled with other modules of a program, or a material element, or a combination of a material element and a software sub-program. Such a material element may comprise an Application-Specific Integrated Circuit (better known under the acronym ASIC) or a Field-Programmable Gate Array (better known under the acronym FPGA) or a Digital Signal Processor (better known under the acronym DSP) or any equivalent equipment. Generally, a module is therefore an element (software and/or hardware) which allows ensuring a function.

The module 26 for receiving keys allows the reception of one key or several keys transmitted by different elements, for example, the user unit 16, one or more external sensors 36, a proximity tag 38 via a wireless reception module 40, etc.

All received keys are transmitted to the module 28 for verifying factors, which verifies the validity of each authentication factor, in other words, it verifies if at least one transmitted key validates the criteria of each authentication factor. For this verification, the module 28 for verifying factors has access to a secure memory 42 comprising pre-configured authentication factors and the associated criteria.

The transmissions of keys to the module 28 for verifying factors are done in an encrypted manner, the decryption of the keys being done only at the module 28 for verifying keys (by a decryption microprogram), for added security. The module 28 for verifying keys and the secure memory 42 are preferably combined in one same secure component, such that the decrypted keys are not accessible outside this component.

If all the authentication factors are unlocked following the verification thereof, the module 28 for verifying keys provides an access authorisation, transmitted to the switch module 34.

Access authorisation to the protected device 18 leads to the switching of the switches connected to the protected device 18: the first controllable switch 32a is electrically closed so as to open the access path 30 to the protected device 18 in case of receiving an access authorisation, or electrically open so as to close the access path 30 if no authorisation is received (therefore by default). Furthermore, the second controllable switch 32b may also be activated at the same time as the first controllable switch 32a, this second switch 32b being connected to an electric supply 44 of the protected device 18: similarly, the second switch 32b is electrically closed so as to supply the protected device 18 in case of receiving an access authorisation, or electrically open so as to block the supply 44 of the protected device 18 if no access authorisation is received.

Thus, without access authorisation, the protected device 18 is neither accessible, nor supplied. If this protected device 18 is a memory, it is impossible to exchange data with this memory or to access the data, and the memory is not visible.

Access to the protected device 18 is regulated by an administrator, allowing determining who has access to the protected device 18 and under what conditions. The user wants to access the protected device 18, and needs therefore to satisfy the conditions set by the administrator.

The administrator pre-configures the authentication factors of the protected device 18 using the administration unit 14. The administration unit 14 is, for example, a smartphone comprising a piece of software (or application) allowing to choose the authentication factors and the pre-configuration of these factors. The administration unit 14 allows the transmission of the authentication factors chosen in the secure memory, via the short-range wireless communication device 20. Data containing the authentication factors (transmitted in encrypted form) is sent via the wireless transmission module 22.

The wireless communication device 20 also comprises an energy collection module 24, allowing to collect energy from different sources (photovoltaic, kinetic, thermoelectric), in particular coming from the administration unit 14 (by electromagnetic induction). The energy collection module 24 allows to supply the access control unit 12, in particular, all modules of the access control unit 12.

In this embodiment, the wireless communication device 20 is a wireless near-field communication device of the NFC type. The energy collection module 24 is thus adapted to collect energy from the administration unit 14, in order to provide the control unit 12 with the time to pre-configure the authentication factors.

Once the factors are pre-configured, the device 18 is protected by the authentication factors. In particular, the path 30 for accessing the protected device 18 is closed by default (and the protected device 18 is eventually not electrically supplied).

When a user wants to access the protected device 18, he needs to open the access path 30 (and eventually the electrical supply 44) of the protected device 18. For this, he needs to fulfil the criteria defined by all the authentication factors. Keys are received by the module 26 for receiving keys, transmitted to the module 28 for verifying keys and verified, as explained above. The user uses the user unit 16 to access the protected device 18. The user unit 16 is, for example, a smartphone comprising a piece of software (or application) allowing an attempt to access the protected device 18, and the transmission of at least one key. The user unit 16 communicates with the wireless transmission module 22 of the short-range wireless communication device 20 through a short-range wireless communication protocol, such as for example, IEEE 802.15.1 (in particular, Bluetooth), IEEE 802.15.11 (in particular, Wi-Fi), etc. Preferably, the communication is done in near-field (distance generally less than 20 cm, preferably less than 10 cm) via a technology such as NFC.

Like the administration unit 14, the user unit 16 may provide the electrical energy necessary for the functioning of the control unit 12 by electromagnetic induction. In certain embodiments, the control unit 12 is only functional when an administration unit 14 or a user unit 16 supplies energy, and is switched off the rest of the time, so as to conceal the presence thereof, by reducing electromagnetic emissions.

At least one key received is transmitted by the user unit 16. This key may be a key verifying one single factor, for example, only the fact that the user unit 16 is present and that a user wants to access the protected device 18, or a more complex factor, such as a password entered by the user in the application of the user unit 16. The user unit 16 may also transmit several keys, some of which independently of a user's desire, to unlock or lock certain authentication factors: for example, keys may be values recorded by sensors of the user unit 16 (temperature sensor, gyroscope, geolocation, clock, etc.), or a telephone identification number. For example, access to the protected device 18 may only be authorised if the user uses an authorised telephone, if the telephone is arranged in a certain configuration (placed on a piece of furniture, therefore horizontally, for example), if the temperature is within a certain range, etc.

Likewise, during an attempt to access the protected device 18 by a user, the module 26 for receiving keys may receive keys coming from external sensors 36. Keys may be values recorded by external sensors 36 (temperature sensor, gyroscope, geolocation, clock, smoke sensor, chemical sensor, etc.). For example, access to the protected device 18 may be denied outside of the predetermined time ranges, if the user has exceeded a maximum connection time, if the protected device 18 is not in a specific arrangement; an access door cannot be unlocked if a chemical sensor detects an abnormal presence of a chemical component in the room to which the door gives access, etc.

A key provided by the user unit 16 may also be provided by an administrator, via the administration unit 14. To obtain this key, the user sends a request via the user unit 16, to the administration unit 14. This request is, for example, sent by SMS (Short Messaging Service) from the application of the user unit 16. The administrator receives the request on the administration unit 14, and manually validates (or does not validate) the request. The validation criteria are chosen by the administrator: for example, if an ID of the user unit 16 (their telephone number, for example) belongs to a list approved by the administrator, they may choose to validate the request. If the administrator lacks information on the user, they may call them by telephone connection between the administration unit 14 and the user unit 16 before deciding whether to validate the request or not. Once the request is validated by the administrator, the administration unit 14 sends a key to the user unit 16, allowing it to unlock at least one authentication factor. The key may be configured, for example, to be only valid for a specific time interval or according to the geolocation of the user unit 16 or of the protected device 18.

In this embodiment, the module for receiving keys may also receive keys from a proximity tag 38, via the wireless reception module 40 of the control unit 12. This proximity tag 38 permanently sends a randomly-generated (and encrypted) key, referred to as proximity key. During the pre-configuration, the administration unit 14 may pair the control unit 12 and the proximity tag 38, such that the control unit 12 considers receiving the proximity key coming from the proximity tag 38 as one of the authentication factors.

The proximity tag 38 communicates via a short-range wireless communication protocol, which may be identical to or different than the communication protocol between the user unit 16 and the wireless communication device 20. If the two communication protocols are different, the interception of the key(s) provided by the user and the proximity key sent by the proximity tag 38 becomes more complex, as the frames of the two different protocols need to be recovered.

Furthermore, the proximity tag 38 is generally hidden from the user, and allows ensuring the presence of the user in the proximity of this tag 38 (in the distance permitted by the short-range wireless communication). For example, a proximity tag 38 concealed in professional premises allows to ensure that access to the protected device 18, for example, a storage medium, is only possible when the storage medium is in the proximity of the proximity tag 38, and therefore within the professional premises. The user cannot know that their proximity with the proximity tag 38 is a condition for unlocking the storage medium, which allows increasing protection against intrusions.

The authentication factor may also be exclusive, in other words access to the device is authorised if a key is not in a specific value or if a key is not received. In particular, in the example of the proximity tag 38 in professional premises, access to a protected device 18, for example, a storage medium comprising personal data, may be locked if the protected device 18 is in the proximity of the proximity tag 38 and therefore within the professional premises. The criterion thus defined by the authentication factor is the non-reception of a key coming from the proximity tag 38.

An application of this example is presented in more detail, in reference to FIG. 2, schematically representing a storage medium 45 protected by an access control system according to an embodiment of the invention.

In particular, the storage medium 45 comprises two protected, distinct, independent and separate memories (in different components), a first protected memory 46a and a second protected memory 46b.

The storage medium 45 comprises a connector, here a USB (Universal Serial Bus) connector 48, allowing, using a plurality of pins (not represented), to transmit data via a data transmission bus 50 and to provide the storage medium 45 with an electrical supply 44. The storage medium 45 may be, for example, a USB flash drive or an external hard drive, connected to a computer using the USB connector 48. The storage medium 45 may also be an internal hard drive of a computer, connected directly to the inside of the computer via a specific connector.

The storage medium 45 comprises a control unit 12 of the access control system, such as defined above in reference to FIG. 1. Interactions with the control unit 12 are achieved, as defined above, using an administration unit 14 (for pre-configuration) and a user unit 16 (for attempting access).

The control unit 12 allows to control access to the two protected memories and the supply thereof. Each protected memory may be considered as a device protected by the access control system. Controlled access to each protected memory is governed by a set of authentication factors specific to each protected memory. For this purpose, the control unit 12 comprises controllable switches combined in one switch module 34, in this case:
- a first controllable switch 32a and a second controllable switch 32b, allowing to open/close respectively access to data from the first protected memory 46a and to supply the first protected memory 46a,
- a third controllable switch 32c and a fourth controllable switch 32d, allowing to open/close respectively access to data from the second protected memory 46b and to supply the second protected memory 46b.

The controllable switches are controlled by the reception (or not) of an access authorisation, as defined above.

Such a storage medium 45 is particularly adapted for a professional and personal application, or for the concealing of data.

In the professional and personal application, the first protected memory 46a is, for example, a memory dedicated to personal data, and the second protected memory 46b is dedicated to professional data. When the user is outside of the professional premises, they are authorised to only access the first protected memory 46a. When the user is in the professional premises, a proximity tag 38 such as defined above allows to authorise access to the second protected memory 46b and to block access to the first protected memory 46a, thus allowing to ensure that personal data is never accessible in the professional environment and that professional data is never accessible in the personal environment. If the protected memories each comprise an operating system, it is possible to use two different and totally separate operating systems (a system not having access to data from the other system), which is particularly useful for practices referred to as BYOD (Bring Your Own Device) or COPE (Corporate Owner, Personally Enabled) wherein the same machine may thus be used for personal or professional reasons, without increased security risks.

In the application of concealing data, a first protected memory 46a may comprise any data and be accessible by default. A second protected memory 46a comprises confidential data, and is only accessible and visible by validating the authentication factor criteria. Thus, if the storage medium is connected to a computer to verify the content thereof, only the first protected memory 46a will be accessible and visible, which draws less attention than if no memory was accessible or visible. The second protected memory 46a is therefore not verified as it is not visible.

The invention claimed is:

1. Access control system to a device protected by at least one pre-configured authentication factor, each authentication factor defining at least one validity criterion for a key and being in a state referred to as unlocked if a key that is presented to it meets the validity criteria, and a state referred to as locked if no key that is presented to it meets the validity criteria, comprising:
an access control unit comprising:
a short-range wireless communication device comprising a wireless data transmission module and an electrical energy collection module,
a module for receiving keys comprising computer hardware programmed to receive at least one key,
a module for verifying factors comprising computer hardware programmed to verify the validity of each pre-configured authentication factor with at least one key received by the module for receiving keys, and to provide an access authorisation if all the authentication factors are in the unlocked state,
at least one access path, adapted to allow access to the protected device, at least one controllable switch configured to open or close the path for accessing the protected device, the access path being, by default, closed and being open in case of receiving an access authorisation coming from the module for verifying factors,
an administration unit, separate from the access control unit and adapted to allow to pre-configure each authentication factor by short-range wireless interaction with the wireless data transmission module of the short-range wireless communication device of the access control unit,
a user unit, which is a separate equipment from said administration unit, said user unit being configured to transmit at least one key to the module for receiving keys, via the wireless data transmission module.

2. The access control system according to claim 1, characterised in that each authentication factor defines at least one validity criterion of a key chosen from the group comprising the following keys:
password,
key transmitted by the administration unit,
geolocation data of the protected device and/or the user unit,
values measured by one or more electronic sensors,
time data,
key coming from a proximity tag.

3. The access control system according to claim 1, characterised in that the short-range wireless communication device is a wireless near-field communication device, and in that the administration unit and the user unit are adapted to supply electrical energy to the electrical energy collection module of the wireless near-field communication device to supply the access control unit.

4. The access control system according to claim 1, characterised in that the access control unit comprises at least one controllable switch configured to open or close an electrical supply of the protected device, independent from the control unit, the supply being, by default, open in case of receiving an access authorisation coming from the module for verifying factors.

5. The access control system according to claim 1, characterised in that it comprises a proximity tag, external to the control unit, comprising a random key generator adapted to periodically generate a proximity key and to transmit the proximity key to the control unit by a wireless communication protocol, said proximity tag and said control unit being paired beforehand by the administration unit.

6. Data storage medium, comprising at least two separate, protected memories, characterised in that access to each protected memory is controlled by the access control system according to claim 1.

7. The access control system according to claim 1, characterised in that the pre-configured authentication factors are comprised in a secure memory of the access control unit.

8. The access control system according to claim 7, characterised in that the module for verifying keys and the secure memory comprising the pre-configured authentication factors are combined in one same secure component.

9. Method for controlling access to a device protected by an access control system to control access to the device protected by at least one pre-configured authentication factor, each authentication factor defining at least one validity criterion for a key and being in a state referred to as unlocked if a key that is presented to it meets the validity criteria, and a state referred to as locked if no key that is presented to it meets the validity criteria, wherein the access control system comprises:
an access control unit comprising:
a short-range wireless communication device comprising a wireless data transmission module and an electrical energy collection module,
a module for receiving keys comprising computer hardware programmed to receive at least one key,
a module for verifying factors comprising computer hardware programmed to verify the validity of each pre-configured authentication factor with at least one key received by the module for receiving keys, and to provide an access authorisation if all the authentication factors are in the unlocked state,
at least one access path, adapted to allow access to the protected device,
at least one controllable switch configured to open or close the path for accessing the protected device, the access path being, by default, closed and being open in case of receiving an access authorisation coming from the module for verifying factors,
an administration unit, separate from the access control unit and adapted to allow to pre-configure each authentication factor by short-range wireless interaction with the wireless data transmission module of the short-range wireless communication device of the access control unit, and
a user unit, which is a separate equipment from said administration unit, said user unit being configured to transmit at least one key to the module for receiving keys, via the wireless data transmission module,
wherein the method comprises:
a step of pre-configuring authentication factors by an administrator using the administration unit,
a step of transmitting at least one key by a user using the user unit,
a step of opening a path for accessing the protected device if all the authentication factors are unlocked.

10. The access control method according to claim 9, characterised in that it comprises:
a step of sending a request by the user via the user unit, to the administration unit,
a step of manually validating, by the administrator, the request via the administration unit,
a step of transmitting a validation key by the administration unit to the user unit, if the request is validated by the administrator.

11. Access control system to a device protected by at least one pre-configured authentication factor, each authentication factor defining at least one validity criterion for a key and being in a state referred to as unlocked if a key that is presented to it meets the validity criteria, and a state referred to as locked if no key that is presented to it meets the validity criteria, comprising:
an access control unit comprising:
a short-range wireless communication device comprising a wireless data transmission module and an electrical energy collection module,
a module for receiving keys comprising computer hardware programmed to receive at least one key,
a module for verifying factors comprising computer hardware programmed to verify the validity of each pre-configured authentication factor with at least one key received by the module for receiving keys, and to provide an access authorisation if all the authentication factors are in the unlocked state,
at least one access path, adapted to allow access to the protected device, at least one controllable switch configured to open or close the path for accessing the protected device, the access path being, by default, closed and being open in case of receiving an access authorisation coming from the module for verifying factors,
an administration unit, separate from the access control unit and adapted to allow to pre-configure each authentication factor by short-range wireless interaction with the wireless data transmission module of the short-range wireless communication device of the access control unit,
a user unit, which is a separate equipment from said administration unit, said user unit being configured to transmit at least one key to the module for receiving keys, via the wireless data transmission module,
the pre-configuration of each authentication factor being only achievable by interaction of the administration unit with the wireless data transmission module of the communication device of the access control unit.

* * * * *